US005450115A

United States Patent [19]

Bergen et al.

[11] Patent Number: 5,450,115

[45] Date of Patent: Sep. 12, 1995

[54] APPARATUS FOR IONOGRAPHIC PRINTING WITH A FOCUSED ION STREAM

[75] Inventors: Richard F. Bergen, Ontario; Robert W. Gundlach, Victor; Remo D'Ortenzio, Rochester; Peter A. Crean; Joseph A. Chizuk, both of Penfield, all of N.Y.

[73] Assignee: Xerox Corporation, Stamford, Conn.

[21] Appl. No.: 331,400

[22] Filed: Oct. 31, 1994

[51] Int. Cl.[6] .................. G01D 15/06

[52] U.S. Cl. .................. 347/123

[58] Field of Search .................. 347/55, 123; 346/159

[56] References Cited

U.S. PATENT DOCUMENTS

| | | | |
|---|---|---|---|
| 4,544,933 | 10/1985 | Heinzl | 347/55 |
| 4,675,703 | 6/1987 | Fotland | 346/159 |
| 4,763,141 | 8/1988 | Gundlach et al. | 346/158 |
| 5,170,185 | 12/1992 | Takemura et al. | 347/55 |
| 5,257,045 | 10/1993 | Bergen et al. | 346/159 |
| 5,270,741 | 12/1993 | Hosaka et al. | 346/155 |
| 5,325,121 | 6/1994 | Genovese | 346/159 |

FOREIGN PATENT DOCUMENTS

| | | | |
|---|---|---|---|
| 0137858 | 6/1988 | Japan | 346/155 |

*Primary Examiner*—Peter S. Wong
*Assistant Examiner*—Randy W. Gibson
*Attorney, Agent, or Firm*—R. Hutter

[57] ABSTRACT

An ionographic printer directs a stream of ions from a source to a charge receptor to create an electrostatic latent image thereon. The ion stream passes through a relatively large aperture having associated therewith a pinch electrode for narrowing the ion stream to a preselected width, and displacing electrodes for positioning the narrowed ion stream within the aperture. Varying the biases of the displacing electrodes causes the ion stream to scan across the aperture to deposit multiple spots of charged areas at desired locations on the receptor. The electrodes can be designed to compensate for spot placement skew and anomalies in the cross-sectional shape of the displaced ion stream.

17 Claims, 7 Drawing Sheets

APPARATUS FOR IONOGRAPHIC PRINTING WITH A FOCUSED ION STREAM

This application incorporates by reference U.S. Pat. No. 5,257,045, assigned to the assignee hereof. Cross-reference is also made to co-pending U.S. patent application Ser. No. 08/329,817, filed Oct. 27, 1994, entitled "Ionographic Printing with a Focused Ion Stream Controllable in Two Dimensions," assigned to the assignee hereof.

The present invention relates to ionographic printers, and more particularly, to an improved apparatus for directing ions in imagewise fashion onto a charge receptor.

In electrophotographic printing, an electrostatic latent image is formed on a charge retentive surface. In the well-known process of xerography, the original electrostatic latent image is formed by providing a photosensitive charge-retentive surface, known as a "photoreceptor," which typically is first charged and then caused to discharge in areas corresponding to the image to be printed when an original light image to be copied is focused on the photoreceptor. The white areas of the original image cause the corresponding areas on the photoreceptor to discharge, while the printed areas (such as alphanumeric characters) on the original image create corresponding dark areas on the photoreceptor, on which the original charge is retained. This latent image is developed by causing toner particles to adhere to the charged areas on the surface. The toner forming this developed image on the surface is then transferred to a sheet, such as of paper, and then the toner is fused on the sheet to form a permanent image.

Another type of printing is known as ionography. In ionography, instead of using light to selectively discharge areas of a charged photoreceptor, a charge-retentive surface is charged in an imagewise fashion by the direct application of ions onto the charge retentive surface, known simply as a charge receptor. U.S. Pat. No. 5,257,045 describes a particular kind of ionography which utilizes a "focused ion stream." In this type of ionography, a continuous stream of ions are emitted from an ion source, such as a corona wire, and are made available to a charge receptor on which a latent image is to be created. Disposed between the ion source and the charge receptor is an ion deposition control device, which is preferably in the form of a substrate interposed between the ion source and the charge receptor. The control device includes a plurality of apertures therein, through which ions can be selectively admitted from the ion source to selected positions on the charge receptor, in order to form a latent image. Each of the apertures in the row has associated therewith a "pinch electrode" and one or more "displacing" electrodes. The purpose of the pinch electrode is to isolate a stream of ions from the radiations of ions which are generally being broadcast from the ion source and, in effect, to "funnel" this particular ion stream down to a predetermined cross-sectional width. By thus focusing an ion stream to a predetermined width, the ion stream can be directed to a suitably small spot size on the charge receptor, which in turn enables the creation of high-resolution latent images on the charge receptor. While the pinch electrode focuses an ion stream onto a small area on the charge receptor, the displacing electrodes are used to direct this narrow beam of ions to the desired location on the charge receptor, so that a desired small area on the charge receptor may be charged according to its location in a desired image to be printed. The practical advantage of ionography with an ion stream is that the apertures can be made relatively large compared to the possible spot size of charged areas on the charge receptor, and therefore the ion deposition control device can be made quite cheaply.

The present invention represents practical improvements to the ionographic printing system disclosed in the patent incorporated by reference.

In the prior art, U.S. Pat. No. 4,675,703 discloses an ionographic printer in which a solid dielectric member having a control electrode and a driver electrode disposed at opposite phases thereof, to cause the formation of ions in a region adjacent the controlled electrode. A screen electrode and a deflection electrode modulate the flow of ions to a charge receptor. The screen electrode is maintained at a fixed potential to control passage of ions through one or more apertures therein, while the deflection electrode provides further control over the size, shape and location of the electrostatic images created on the charge receptor. The deflection electrode may take the form of a conductive member on one side of the ion path, or two or more conductors straddling this path.

U.S. Pat. No. 4,763,141 discloses an ion source in which a corona wire is located 1–5 mm away from biased conductive plates which form a slit that allows ions to pass therethrough onto a receptor surface. The conductive plates are used to control the flow of ions through the slit and opposing wedges are positioned on each conductive plate to focus additional ions to the center of the slit. At the inside edges of the slit are additional fringe electric fields that aid in pumping the ions out of the slit.

U.S. Pat. No. 5,325,121 discloses an ionographic printing system in which there are provided electrodes adjacent the ion path to a charge receptor moving in a process direction. The electrodes are biased to an AC source. The frequency of the AC is selected to sweep the ion stream in two directions, parallel and anti-parallel to the process direction. The purpose of this sweeping of the ion stream is to disperse ions over a wider area on the charge receptor, and also to correct for velocity errors in the moving charge receptor.

According to one aspect of the present invention, there is provided an ionographic image printing apparatus, comprising an ion source, a charge receptor, means for moving the charge receptor in a process direction, and a substrate disposed between the ion source and the charge receptor. The substrate defines an aperture therein for passage of ions therethrough. A displacing electrode displaces an ion stream passing through the aperture to a selectable extent along a displacement path which is diagonal to the process direction.

According to another aspect of the present invention, there is provided an ionographic image printing apparatus, comprising an ion source, a charge receptor, and a substrate disposed between the ion source and the charge receptor. The substrate defines an aperture for the passage of ions therethrough. A displacing electrode displaces an ion stream passing through the aperture to a selectable extent along a displacement path. A focusing electrode, spaced from the displacing electrode and substantially aligned with the aperture, forms a concentrated electric field toward an aperture edge corresponding to a displacement path end.

According to another aspect of the present invention, there is provided an ionographic image printing apparatus, comprising an ion source, a charge receptor, and a substrate disposed between the ion source and the charge receptor. The substrate defines an aperture for the passage of ions therethrough. A displacing electrode displaces an ion stream passing through the aperture to a selectable extent along a displacement path and also forms a concentrated electric field toward an aperture edge corresponding to a displacement path end.

Figure 10:
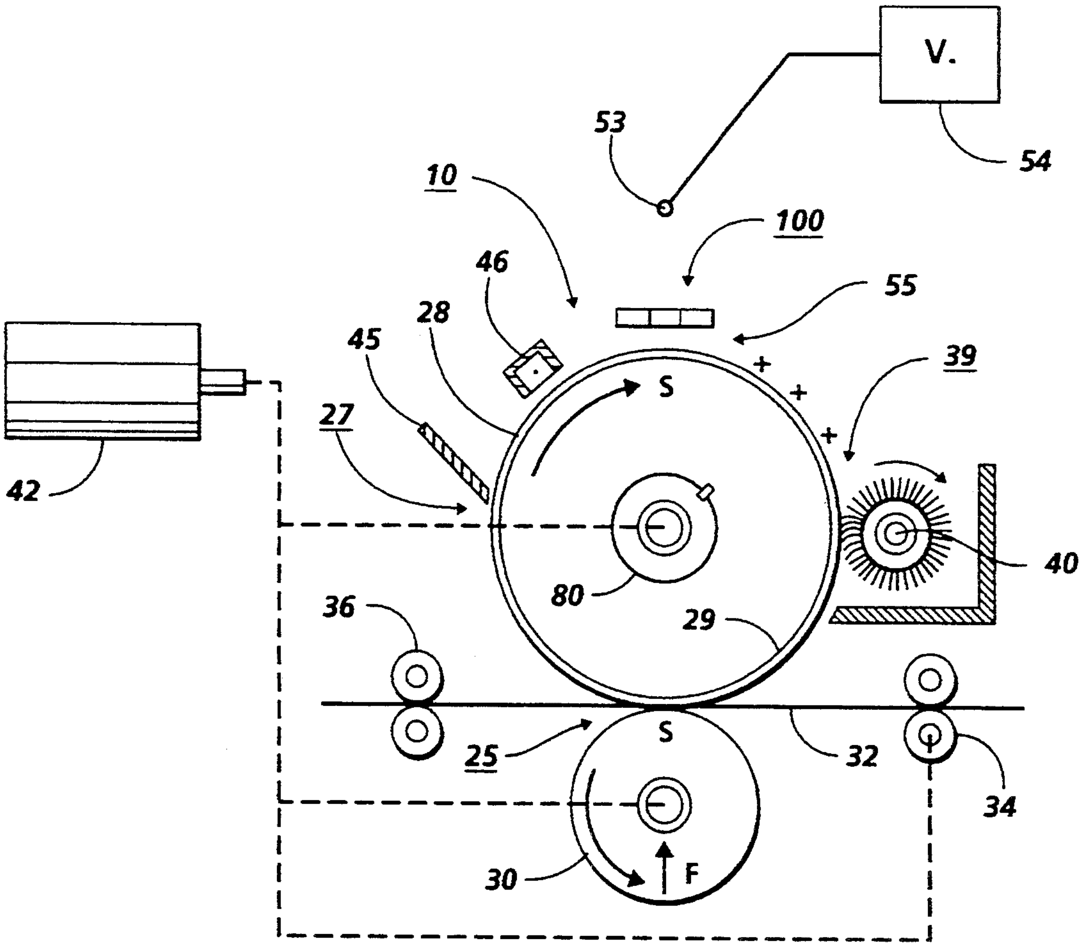
FIG. 10 PRIOR ART
FIG. 10 is a simplified elevational view of an ionographic printer incorporating the present invention.

FIG. 10 shows the basic elements of an ionographic printer. Printer 10 includes a dielectric charge receptor 27 in the form of a conductive substrate 29, here in the form of a drum or cylinder, having an electrostatically chargeable dielectric layer on its surface 28. While the receptor of printer 10 is shown and described in the form of a drum, other receptor types, such as a belt, may be envisioned. Receptor 27 is suitably supported for rotation in the direction shown by the solid line arrow in a suitable housing (not shown). In the example embodiment shown, a pressure cylinder or roller 30 is rotatably supported below receptor 27 and in operative relation thereto, at transfer station 25, roller 30 cooperating with receptor 27 to define a nip through which copy sheets 32 may pass. Roll pair 34 on the upstream side of transfer station 25 and roll pair 36 on the downstream side of transfer station 25 are provided for bringing sheets 32 into and out of transfer relation with receptor 27 at transfer station 25. Other methods for transfer of developed images, as opposed to pressure roller 30 shown, include electrostatic transfer using one or more transfer coronodes. Other transfer methods familiar in the general art of xerography will be apparent to one skilled in the art.

Sheets 32 are supplied from a suitable source such as a paper tray (not shown) having sheet feeder means and activated to advance the sheets forward in timed register relation with the images on receptor 27 for feeding to transfer station 25.

A developer roll 40 is provided at developing station 39 for developing the latent electrostatic images formed on receptor 27 prior to transfer. Developer roll 40 is rotatably mounted within a developer housing having a supply of toner for use of developing the electrostatic images on surface 28 of receptor 27. Developer roll 40 typically rotates in a direction opposite that of receptor 27, as shown by the arrow. Receptor 27, pressure roller 30, roll pairs 34 and 36, and developer roll 40 are suitably drivingly coupled to and rotated by a suitable motor 42.

To remove residual or leftover toner powder from receptor 27 after the transfer step, a scraper blade 45 is provided. Blade 45 engages against the surface of receptor 27 to wipe toner therefrom. A suitable erase apparatus 46 is provided downstream of blade 45, to discharge any left over charges remaining of receptor 27.

The latent electrostatic images formed in the dielectric layer forming surface 28 of receptor 27 that are thereafter developed by developer roll 40 form a toner powder image on the charge receptor. The toner powder image is then simultaneously transferred and fixed to the sheet 32 at transfer station 25 through pressure engagement between receptor 27 and roller 30. Once again, alternate transfer techiniques are well-known and applicable to the present invention.

At the beginning of the ionographic process, at a step corresponding to the top of receptor 27 as shown in FIG. 10, the originally-discharged surface 28 of receptor 27 is charged in imagewise fashion by ions emitted from source 53, which is typically, though not necessarily, in the form of a corona wire generally adjacent the receptor 27 across the width thereof. The source 53 is typically connected to a voltage source 54. Interposed between the source 53 and the surface 28 of receptor 27 is an ion deposition control device generally indicated as 100. Control device 100 has defined therein a plurality of openings to selectably allow the passage of ions from source 53 to the surface 28 of receptor 27, as receptor 27 moves in a process direction. The imagewise deposition of ions on the moving receptor 27 is caused by selective control of the apertures in control device 100 either to permit or not permit the passage of ions therethrough in accordance with digital image data. By coordination of the imagewise modulation of the ion flow through the openings in control device 100 with the motion of receptor 27, the ions emitted from source 53 form the desired electrostatic latent image on receptor 27 for subsequent development at developing station 39 and transfer to a sheet at transfer station 25.

Figure 1:
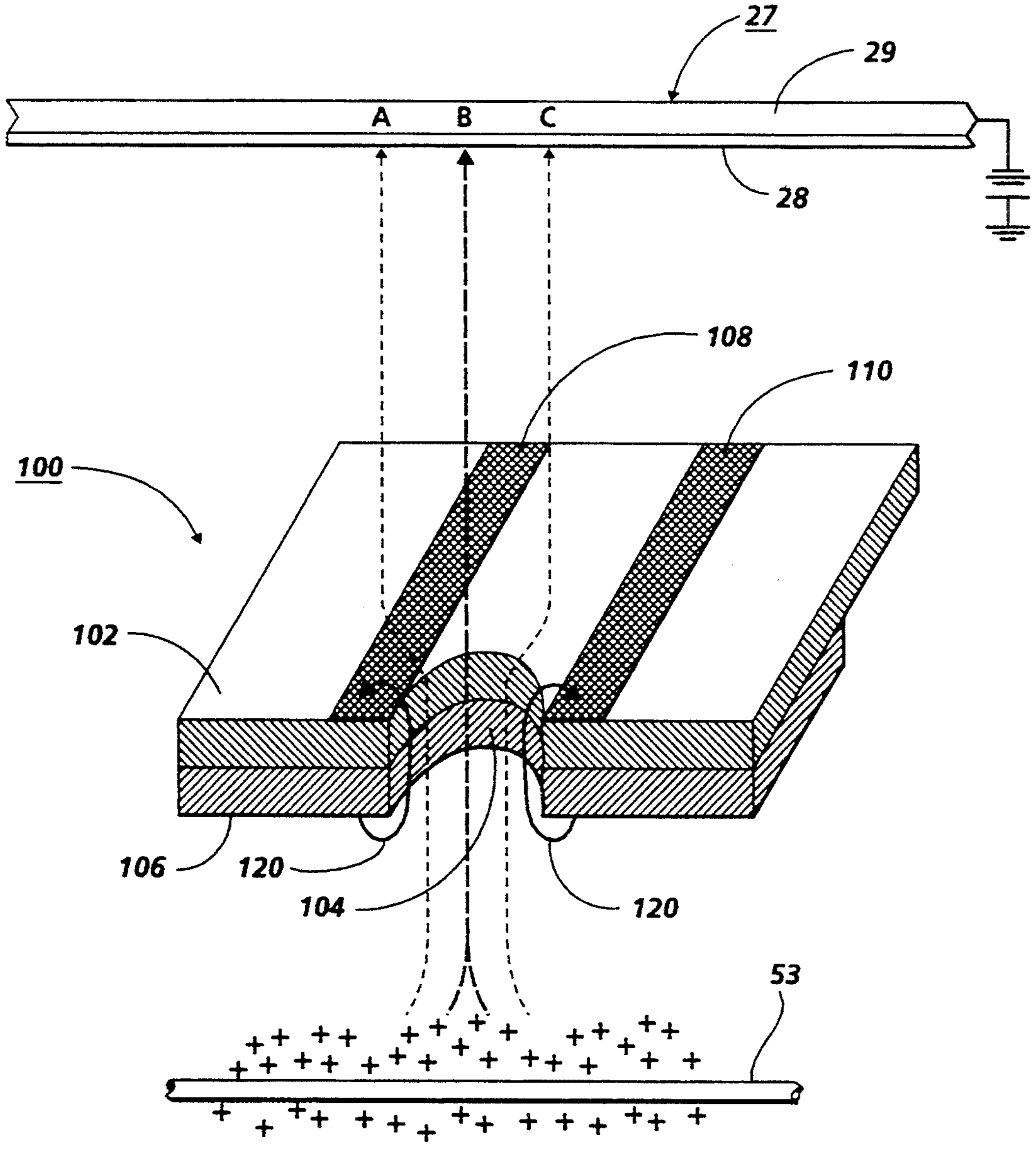
FIG. 1 PRIOR ART
FIG. 1 is a detailed sectional elevational view of an ion stream control device according to the present invention.

FIG. 1 is a sectional elevational view through one opening in control device 100, showing the passage of positive ions, indicated as +symbols, from the source 53 through the opening to the surface 28 of receptor 27. Although a source of positive ions is shown in the present embodiment, it will be understood that the invention could be made to work with a source of negative ions as well. Source 53 may be in the form of a corona wire extending adjacent a plurality of such openings 104 arranged in a linear or staggered linear array, or possibly the source 53 may be in the form of electrically biased pin points centered adjacent each individual opening 104. Device 100 comprises an insulative substrate 102 having an opening 104 defined therein for the passage of ions therethrough. On the side of the substrate 102 facing the source 53 and, in this embodiment, substantially surrounding the entire edge of opening 104 is what shall be referred to herein as "pinch" electrode 106. On the side of substrate 102 facing receptor 27 are a first displacing electrode, indicated as 108, and a second displacing electrode, indicated as 110. As shown in FIG. 1, the displacing electrodes 108 and 110 are placed on the side of the substrate 102 facing receptor 27 and configured such that the displacing electrodes 108 and 110 are disposed on opposite sides along the edge of opening 104, and therefore electrically separated.

In general, substrate 102 may be made of any suitable dielectric substance such as plastic, although polycarbonates and synthetic materials such as that sold under the trade name "Kapton" are particularly suitable. A preferred thickness of substrate 102 is from 0.002 inches to 0.125 inches. Typical suitable materials for the pinch electrode 106 and the displacing electrodes 108 and 110 include copper, although conductors which are less apt to corrode in an ionized environment, such as gold or stainless steel, are preferred. A preferred range of diameter for opening 104 is from about 0.005 inches to 0.2 inches.

In operation, ions are caused to pass from the source 53 through control device 100 to receptor 27 in the following manner. Leaving aside for the time being considerations of placements of ions on a specific area of the receptor 27, the ions from source 53 are caused to move in the desired manner due to the potential difference between the source 53 and pinch electrode 106. This creates a "potential well" to drive the ions in the control device 100. The pinch electrode 106, the displacing electrodes 108 and 110, and the receptor 27 are respectively biased from high to low potentials, or specifically from more positive to less positive voltages, in that order. For example, typical values of DC bias for the respective elements would be as follows: the corona wire in source 53, +5000 volts; the pinch electrode 106, +1300 volts; displacing electrodes 108 and 110, +1000 volts each; and surface 28 of receptor 27, 0 volts. In general, the relative values of these biases are more important than their absolute values; the zero point in this descending order of DC biases is not important as long as the descending order is maintained. It is possible that surface 28 of receptor 27, for example, may have a very small positive bias, zero bias, or a negative bias, as long as a potential well effect is maintained. As the ions emitted from source 53 are of a positive charge, a negative bias on the surface 28 of receptor 27 will advance the passage of ions thereto.

When the pinch electrode 106 and the displacing electrodes 108 and 110 are biased to form a potential well, these electrodes create "pumping" electric fields on either side of opening 104, the fields being generally in the direction of an ion stream passing from source 53 through opening 104 to receptor 27. In the case where there is no lateral displacement of the ion stream through opening 104, the ions from source 53 will pass straight through opening 104 and "land" on surface 28 at the point marked B. One specific function of the pinch electrode 106 is to control the width of the ion stream passing through the opening 104. These pumping fields, such as that shown by arrows 120, have the effect of "catching" the ion stream from source 53 (the ions being naturally attracted to progressively lower potentials) and, in effect, focusing or acting as a funnel to draw the ion stream through opening 104. As pinch electrode 106 is biased more positively relative to either of the displacing electrodes 108 or 110 on the other side of substrate 102, the pumping fields are caused to loop through the opening 104 from pinch electrode 106 to either of the displacing electrodes 108 or 110. The strength of these fields 120 serve to control the width of the ion stream through opening 104. The bias on pinch electrode 106 therefore serves to collect and "pinch," or narrow, the width of the ion stream. The width of the resulting stream can be made significantly smaller (e.g., one-third to one-tenth the diameter, or even smaller) than the opening 104 itself. This pinching of the ion stream can be exploited to increase the resolution of an electrostatic latent image on receptor 27, as will be described in detail below.

While the pinch electrode 106 is used to control the width of the ion stream, displacement electrodes 108 and 110 are used to displace the position of the ion stream within the opening 104, and therefore to essentially "aim" the pinched ion stream to a specific desired area on the receptor 27. Because, by virtue of the pinch electrode 106, the width of the ion stream can be made small relative to the width of the opening 104, the ion stream may be placed on the receptor 27 in an area within the area of the corresponding opening, and with a resolution which is much smaller than the size of the opening 104. Displacement of the ion stream to a precise area on the receptor 27, such as the areas marked A or C on surface 28, is accomplished by adjusting the relative biases of first displacing electrode 108 and second displacing electrode 110.

Figure 2:
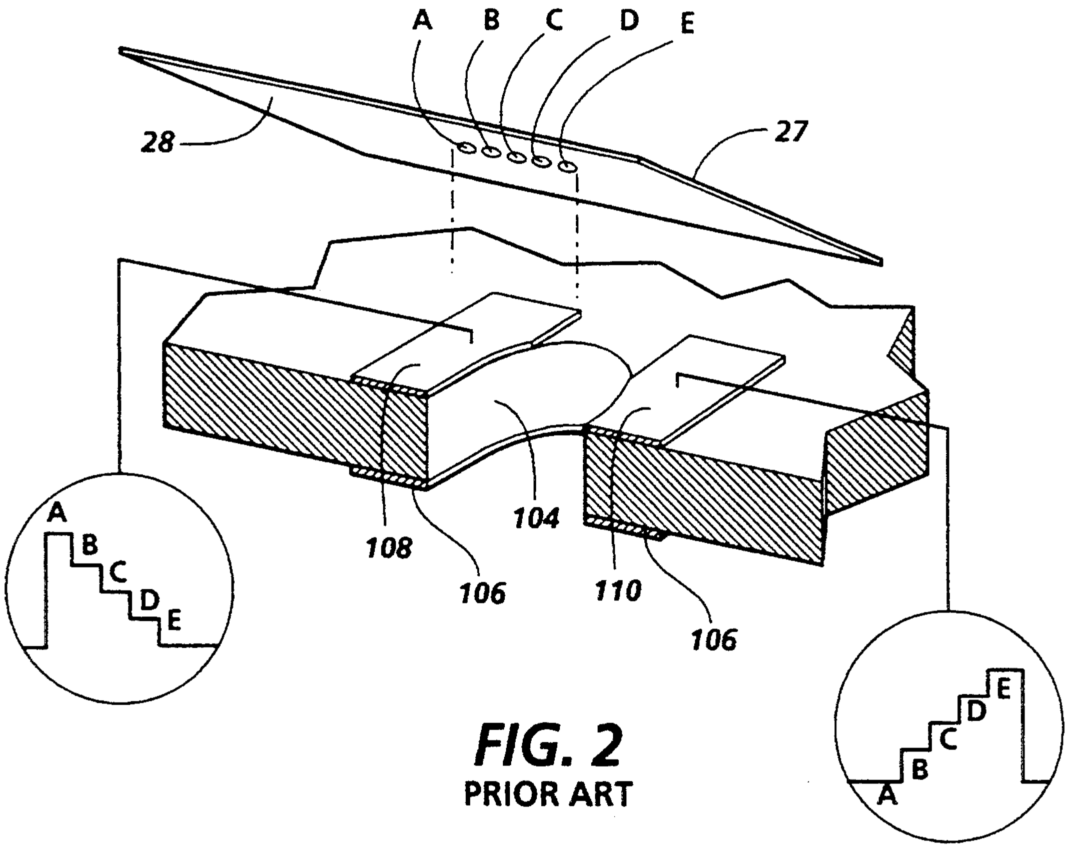
FIG. 2 PRIOR ART
FIG. 2 is a perspective view of a single aperture in a prior-art ionographic apparatus, showing the technique of spot placement in a single aperture.

FIG. 2 illustrates how the relative biasing of displacing electrodes 108 and 110 can be employed to create high-resolution electrostatic images on surface 28 of receptor 27. The individual spots indicated as A, B, C, D, and E on surface 28 represent areas on surface 28 which are charged by the impingement of ions from ion source 53 through one opening 104 in control device 100. Various charged areas such as spots A, B, C, D, and E can subsequently be developed with toner to form desired images. Each spot A, B, C, D, and E represents the end of one pinched ion stream which has been displaced to one of five positions as it passes through opening 104 to "land" in the desired area on surface 28, generally scanning the diameter of opening 104 or slightly greater than the diameter of opening 104. Indicated next to displacing electrodes 108 and 110, respectively, are simplified voltage diagrams showing the relative values of voltage biases for the displacing electrodes to cause the ion stream to be placed on the surface 28 in the desired area with the corresponding letter. The voltage levels indicated in the graphs are given for relative values only, and the absolute numerical values of these voltages can be determined when an actual apparatus is designed. Taking the spot marked A as an example, it can be seen that, for placement of such a spot in the desired area, the bias of displacing electrode 108 is low relative to the bias on displacing electrode 110, as can be seen in the graphs. To place the desired spot further to the right in the Figure, the bias on displacing electrode 108 is increased while that on displacing electrode 110 is correspondingly decreased, as shown by the relative values of the voltages on either displacing electrode for spots B, C, D, and E. The adjustment of the relative biases of displacing electrodes 108 and 110 can thus be used to create a scanning of the ion stream across the receptor 27, and preferably (from an image creation standpoint) through a direction orthogonal to the direction of motion of receptor 27.

The advantage of these displacing electrodes 108 and 110 is that spots of charged area, which can be accumulated on the surface 28 to form a desired electrostatic latent image, can be made much smaller than the diameter of an opening such as 104, and can be placed with great precision anywhere within the area corresponding to the opening 104. Thus, in the example shown, in which there are five possible image spots relative to the diameter of opening 104, the possible resolution of an image created is increased fivefold. This increase in resolution can be translated into greater image quality, or can be exploited to create a less expensive control device, with larger and fewer openings 104. Of course, the existence of five subspots within the opening 104 is arbitrary; it is conceivable that the resolution within each opening 104 could be increased to, for example, ten spots or higher, through more precise control of the relative bias of the displacing electrodes.

Figure 3:
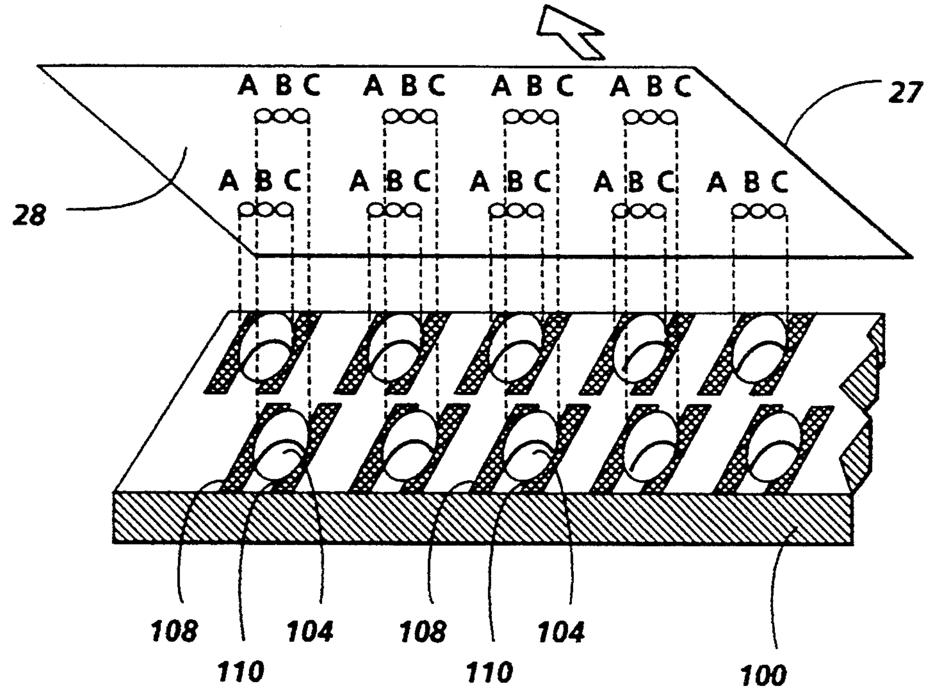
FIG. 3 PRIOR ART
FIG. 3 is a simplified perspective view showing the operation of a prior-art ionographic printing apparatus having a plurality of apertures for the selective passage of ion streams therethrough.

FIG. 3 shows a control device 100 having a plurality of openings 104 in a substantially linear (specifically a staggered linear) array. The openings 104 are arranged perpendicular to the direction of motion of receptor 27, so that lines of areas on surface 28 of receptor 27 to be imagewise charged can be placed on receptor 27 as receptor 27 moves past the staggered linear array. The array of openings 104 is staggered, as shown, to facilitate abutment or slight overlap of areas on the receptor 27 within range of each opening 104.

In the embodiment shown in FIG. 3, each opening 104 in the staggered linear array is suitable for charging three spots (as opposed to five in the embodiment of FIG. 2) within the area "covered" by each opening. Thus, at a given time, by manipulation of pinch electrode 106 and displacing electrodes 108 and 110 for each opening 104, a spot in areas A, B, or C may be placed on the surface 28 as needed to create a particular desired electrostatic latent image. On the opposite side of the control device 100 than is shown in FIG. 3, each opening 104 has associated therewith an independently-controllable pinch electrode 106. As mentioned above, the purpose of pinch electrode 106 is to narrow the ion stream passing through the opening 104 by creating electric fields around the edges of opening 104. Because the pinch electrode 106 on a particular opening 104 can be used to shut off the ion stream completely, the pinch electrode 106 can thus be used for an input of image data to a particular spot being printed at a given moment. For example, if a particular spot in a given image requires the placement of charge in the spot (for subsequent development as a "print-black" area), a pinch electrode 106 can be activated to create the potential well which allows the ion stream to pass to the desired spot. If the desired spot is desired to be a "print-white" area, the pinch electrode 106 can be biased so that no ions reach the spot on surface 28. An array of openings 104, each with an independently controllable pinch electrode 106, then, may be easily adapted to render digital imagewise data on a moving receptor 27, much like any familiar type of dot-matrix printing arrangement. Even though the voltages involved in controlling the pinch electrode 106 can be high, extremely low currents can be employed to avoid expectable problems associated with high power.

In operation, each lettered spot associated with each opening 104 in the staggered linear array is "printed" (i.e., activated to permit or not permit the passage of ions to the respective spot on the receptor 27 in accordance with imagewise data) at the same time. Thus, by relatively biasing the displacing electrodes 108 and 110 for each individual opening 104 in the same way at the same time, all the spots A in a line may be printed, and then by readjusting the relative bias of every displacing electrode in the linear array, spots B and then C can be printed. Then, as the receptor 27 continues its relative motion, the next line of image data can be printed. The staggering of openings 104 in the array of course creates a staggered printing line, as shown, but this can be compensated for by delaying the loading of data as necessary to every other opening 104, in a manner which would be apparent to one skilled in the art. Similarly, the continuous movement of receptor 27 may require a compensation in the nature of the image data to the spots A, B, C in succession, since a finite amount of time is necessary to allow the creation of the spot with a necessary charge.

The ion deposition control device places streams of ions, creating spots of charged area on the latent image, on a charge receptor 27 which is typically moving at constant velocity. As shown in FIG. 3, the charge receptor 27 is caused to move continuously in a process direction P, as shown by the arrow, which is generally perpendicular to the orientation of the row of apertures 104. In a practical printing apparatus, it is preferable that the receptor 27 move continuously, and not in a stepped fashion, which would add to the expense of the apparatus, and also possibly introduce a source of positional error. However, because of the positions of the displacing electrodes 108 and 110, the ion stream passing through the aperture 104 is deflectable only through a path which is, as shown in FIGS. 2 and 3, substantially perpendicular to the process direction P. The fact that the receptor is moving at a constant velocity will mean that the resulting spots formed on the surface 28 will not be placed in a line perpendicular to the process direction P. Because (to take the example of FIG. 3) spot A will be created first in time before spot B and spot C as the surface 28 moves at constant velocity, the three spots will be arranged diagonally as they are made on the surface 28.

Figure 4:
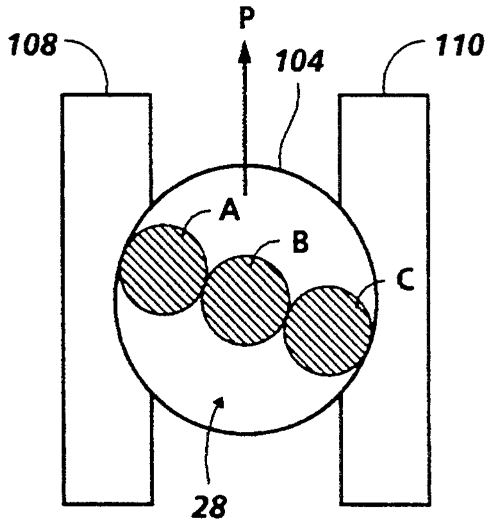
FIG. 4 is a plan view through a single aperture of an ionographic apparatus, illustrating the anomaly of spot placement skew.

FIG. 4 is a plan view through a representative aperture 104 to show the placement of spots A, B, and C on a surface 28 moving through process direction P. If straight lines across the surface 28 are desired to be printed, these lines will show a zig-zag affect, also known as "shingling," caused by the different spot families A, B, and C over a large number of apertures 104 being diagonally skewed relative to each other.

Figure 5:
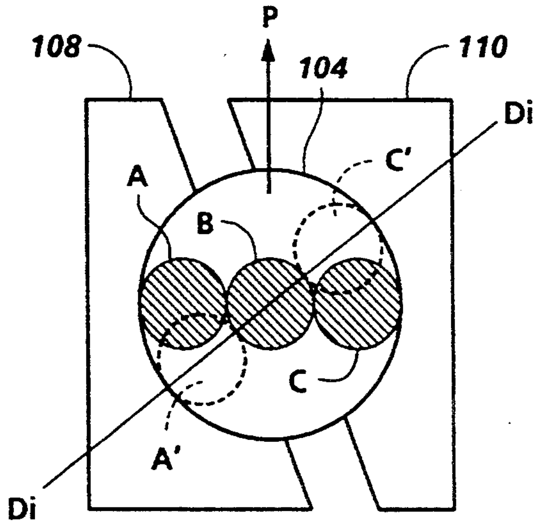
FIG. 5 is a perspective view of a single aperture, with associated electrodes, of an ionographic apparatus according to the present invention.

According to the present invention, this shingling effect caused by the motion of the receptor 27 can be compensated for by orienting the deflecting electrodes 108 and 110 at a diagonal relative to the process direction P of the receptor 27. FIG. 5 is a plan view through an aperture 104 displacing electrodes 110 and 108 according to the present invention. The displacing electrodes 108, 110 are disposed around the edges of an aperture 104 in such a way that the displacement path Di-Di of an ion stream passing through the aperture 104 is at a diagonal (that is, neither perpendicular nor parallel) relative to the process direction P. The locations of the ion streams for each displacement relative to the non-moving aperture 104 are shown in phantom as A′ and C′, and so the placement of the resultant spots of charged area A and C on the moving charge receptor 27 will be perpendicular to the process direction P, as desired. Thus, when the displacing voltages (as shown in FIG. 2) are successively applied to displacing electrodes 108, 110, the timing of these displacement voltages will be coordinated with the continuous motion of the receptor 27, in order to effect this skew compensation.

Figure 6:
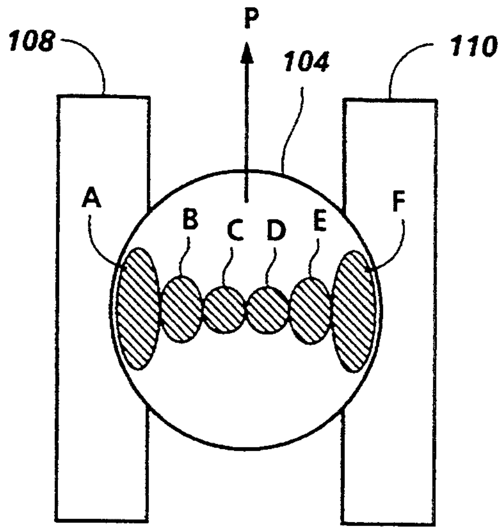
FIG. 6 is a plan view through a single aperture in an ionographic apparatus, showing the anomaly of ion stream cross-section distortion.

Another practical consideration for ionographic printing with a focused ion stream is the "bow tie" effect of deflected ion streams. Ion streams which are deflected minimally by the displacing electrodes 108 and 110, and which therefore pass through the aperture 104 toward the center thereof, tend to be reasonably round in cross-section. However, when the displacing electrodes 108 or 110 are used to displace this ion stream toward one edge or another of the aperture 104, the cross-sectional shape of the deflected ion stream tends to flatten out and become not round but elongated-oval. Because of the oval shape of the cross-section of the ion stream passing through aperture 104, the resulting spot of charged area on the surface 28 will be a flattened oval area; and when the charged area is developed with toner, the various spots of developed area will vary in shape and size. FIG. 6 is a plan view through an aperture 104 showing a typical behavior of an ion stream at various extents of displacement, shown in cross-section as A-F. The spots related to more displaced ion streams, such as spot A near electrode 108 or spot F near electrode 110, do not exhibit the desirable round shape of the spots such as C and D toward the center of the aperture 104.

Figure 7:
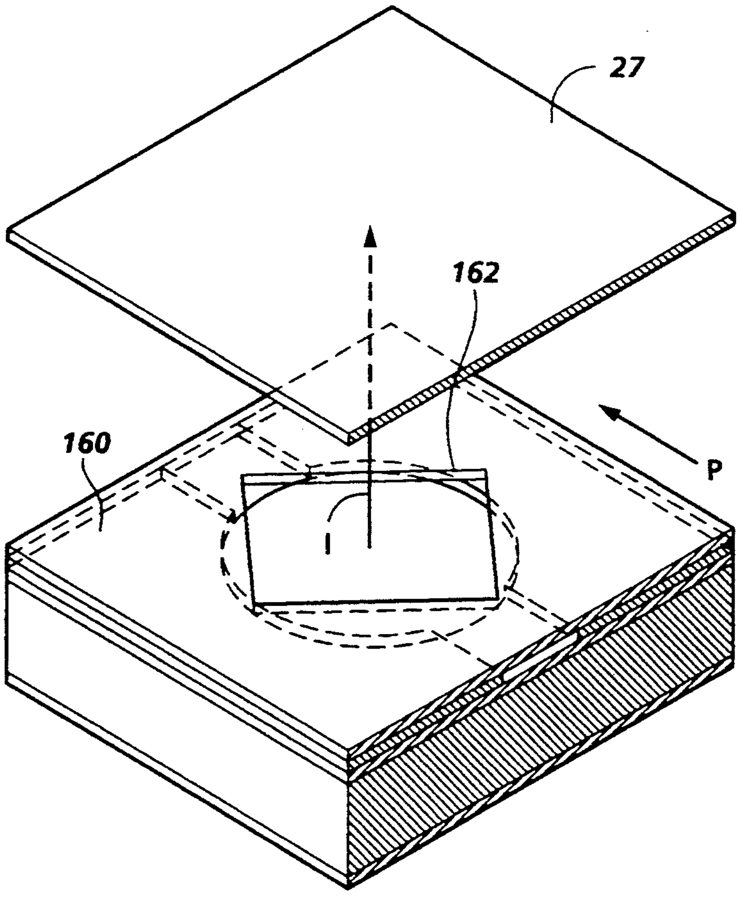
FIG. 7 is a perspective view of the area around an aperture of an ionographic printing apparatus according to one aspect of the present invention.

FIG. 7 shows a structure for overcoming the bow-tie effect. There is shown, at a second location along the length of the aperture 104, a focus electrode 160, which in this embodiment includes a main conductive surface which faces the charge receptor 27. This focus electrode 160 defines therein an aperture 162, which is aligned with the aperture 104 so that the ion stream I passing through aperture 104 will pass through aperture 162 as well. The aperture 162 in focus electrode 160 preferably has a diamond shape, with two of the four points of the diamond corresponding to the ends of the deflection path of the ion stream I which is caused by displacing electrodes 108 and 110. The intention is that the edges of aperture 162 taper toward the ends of the displacement path caused by the displacing electrodes, and in the illustrated embodiment, the displacement path of the ion stream I caused by displacing electrodes 108 and 110 is perpendicular to the process direction P of the charge receptor 27.

It has been found that the tapered "points" of the aperture 162 in focus electrode 160, when biased with a fixed and constant DC bias, produce electric fields within the space of the aperture 162 that effectively squeeze the ion stream passing through the aperture 162. The squeezing effect increases toward the "points" of the diamond shaped aperture. The ion streams which are oval in cross-section, such as A and F in FIG. 6, are effectively corrected by the relative concentration of fields toward the points of the aperture 162. These concentrated fields in effect "squeeze" the displaced ion stream into the desired round shape as the displaced streams, such as A and F in FIG. 4, approach the edges of the aperture 162 at the ends of the displacement path.

The actual bias applied to the focus electrode 160 will depend on the actual physical configuration of the system as a whole. The electrode 160 is insulated from the displacing electrodes 108 and 110 by an insulating substrate 164. As shown in FIG. 7, the substrate 164 is thinner than the substrate 102, but the relative thicknesses of the substrates can be wideranging. Generally, the bias on focus electrode 160 should preferably be consistent with the "potential well" between the ion source and the charge receptor, i.e., should generally be of a value between that of the pinch electrode 106 and the bias, if any, on the charge receptor 27. The relative placements of the pinch electrode 106, displacing electrodes 108 and 110, and focus electrode 160 will have an effect on the desirable relative biases of these various electrodes for optimal performance.

Figure 8:
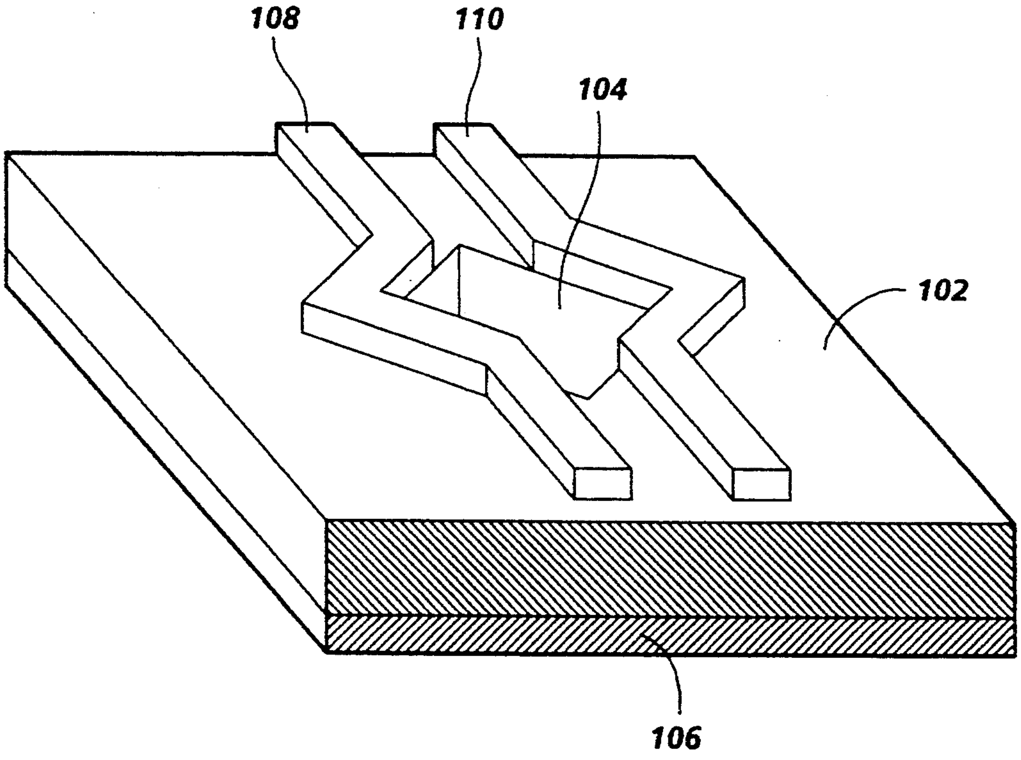
FIG. 8 is a perspective view of the area around an aperture of an ionographic printing apparatus according to another embodiment of one aspect of the present invention.

The important functional feature about the aperture 162 in focus electrode 160 is that the focus electrode forms a concentrated electric field toward an edge of the aperture 104 corresponding to an end of the displacement path. Although in the FIG. 7 embodiment of the invention, this concentrated electric field is formed by the angled borders of aperture 162 in focus electrode 160, such a concentration of electric fields could be created by shaping the displacing electrodes 108 and 110 themselves. FIG. 8 shows a low-cost version of an ion deposition control apparatus utilizing the "squeezing" principle to eliminate the bow-tie effect. In this embodiment, the tapered points are formed by the aperture 104 itself being diamond-shaped, with the displacing electrodes 108 and 110 having edges which follow the edges of the aperture 104.

The FIG. 8 embodiment of the invention has the advantage of being low-cost: the extra focus electrode 160 and substrate 164 in the FIG. 7 embodiment are not necessary. However, one advantage of providing an extra electrode along the ion stream path I, as with the focus electrode 160 in the FIG. 7 embodiment, is that the extra electrode facilitates a more effective "potential well" (the succession of lower potentials) to be created from the ion source to the charge-retentive surface, thereby allowing more precise and accurate control over the ion stream, and therefore over the size and placement of the spot resulting on the charge-retentive surface. In either case of the FIG. 7 or FIG. 8 embodiments, the edge of the aperture need not be diamond-shaped to provide the necessary taper at the ends of the displacement path, but could alternately be, for example, football-shaped, with only two pointed edges. Also, for either embodiment, the tapered-edge concept could be combined with the skew-correction arrangement of FIG. 5; that is, the displacing electrodes 108, 110 in FIG. 7 or FIG. 8 could be arranged diagonally relative to a process direction of the charge-retentive surface, for a total system capable of compensating for both the shingling and bow-tie anomalies.

Another improvement to the practical performance of an ionographic printer with a focused ion stream relates to improving the performance of an apparatus having two distinct rows of apertures 104 in the substrate 100, as shown in FIG. 3. In practical use of such an apparatus to create a desired image, different apertures 104 will selectably block or admit ion streams therethrough. Because any number of different kinds of images can be printed, it is unpredictable at any given moment which apertures will have blocking voltages associated therewith, and which apertures will be admitting ions therethrough. For example, in printing a "white" portion of an image, all of the apertures in the two rows will be blocking ion streams; if text is being printed on the receptor in an area thereof corresponding to one discrete section of the two rows of apertures 104, these apertures 104 will be selectably admitting ions therethrough while the other apertures will continue to block ions. What occurs, then, is that ions are not evenly distributed along the length of the two rows, and ions may not be uniformly available in different areas along the two rows.

Figure 9:
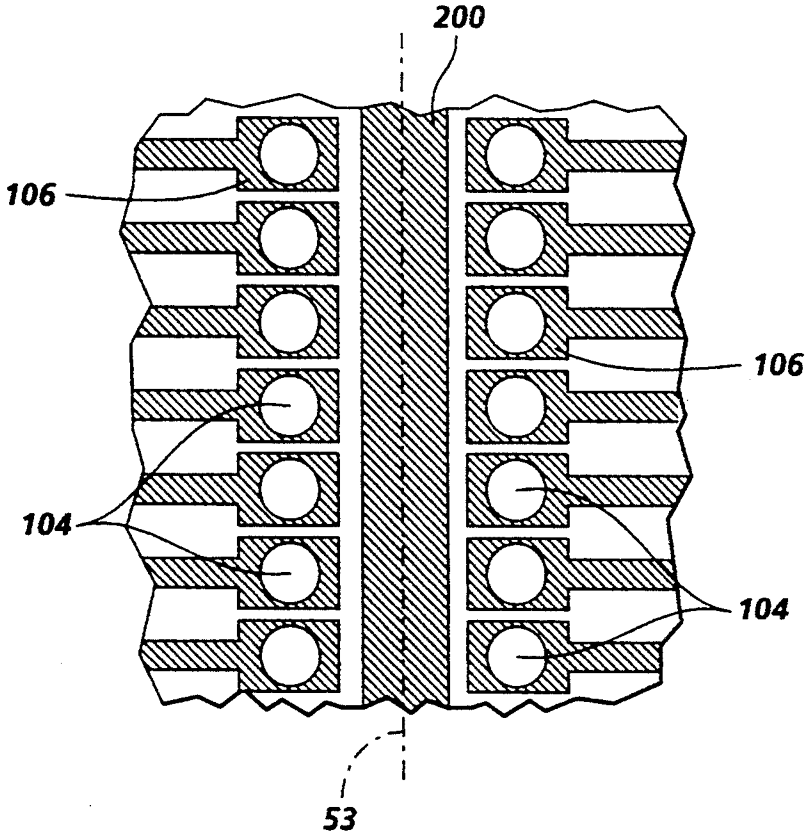
FIG. 9 is a plan view showing a plurality of apertures in an ionographic printing apparatus, according to another aspect of the present invention.

FIG. 9 shows another aspect of the present invention, which cures these charge anomalies. FIG. 9 shows a reference electrode disposed on the side of substrate 100 facing the ion source 53. Preferably, this additional reference electrode is disposed between rows of apertures 100, and is intended to extend along the length of the coronode wire 53. The purpose of this reference electrode, shown in FIG. 9 as 200, is to equalize the distribution of charge along the rows of apertures 104, and also along the length of a coronode wire 53. As shown in FIG. 8, coronode wire 53 is shown as a dotted line extending along the length of the reference electrode 200, shown in plan view. The conductive reference electrode 200 allows, along the length thereof, an equalization of charges along the rows of aperture 104, thus equalizing the charging effects caused by the various apertures in the course of creating a latent image.

The displacing electrodes 108, 110 are uniformly spaced relative to an edge of a portion of the aperture 104. As used in the claims herein, the phrase "uniformly spaced" shall mean that at least one edge of the displacing electrode should follow the contour of a portion of the aperture 104. The edge of the displacing electrode could be exactly contiguous with the edge of the aperture 104 (i.e. the spacing could be uniform but zero), or, according to a preferred embodiment of the invention, there may be provided some spacing between the edge of the displacing electrode and the edge of the aperture, so that the edge of the displacing electrode is unformly spaced slightly away from the edge of the aperture. As with any electronic device having exposed conductors, the ion deposition control device may be prone to arcing between exposed conductors at different potentials. One design modification which reduces the incidence of arcing is to provide, along the edges of each aperture 104, a uniform spacing between the electrode on the surface of substrate 100 (either the pinch electrode 106 or one of the displacing electrodes 108, 110) and the actual edge of the aperture 104 itself. Thus, in the case of the displacing electrodes, the displacing electrodes such as 108 or 110 should be placed on the surface of the substrate 100 and should substantially follow the edge of the aperture 104, but should be uniformly spaced from the actual edge of aperture 104. The spacing from the edge of the electrode to the edge of the aperture 104 is preferably on the order of approximately 2 mils, for a substrate 100 having a thickness of 9 mils or less. As a general guideline, it is preferred that the spacing between the electrode edge and the aperture edge be no more than 3 mils, for a substrate 100 having a thickness of no more than 10 mils.

Another design improvement which may increase the performance of an ionographic apparatus according to the present invention is to provide as an ion source an insulated corona wire, such as shown as 53 in FIG. 1. If an insulated wire is provided, the general design of the apparatus can be simplified. A bare wire, which is the most basic source of ions, needs to be stretched across the array of apertures 104, and has to be protected from being touched by paper fibers or other debris, which may present a safety problem. In contrast, an insulated corona wire 53 can simply be placed in any desired position relative to the array of apertures 104. The insulated wire can be adhesively attached to a support plate spaced form the ion deposition control device, and can thus be "snaked" in specific arrangements. For example, if there exists in the array two rows of apertures 104, an insulated corona wire 53 can be formed with a "hairpin" turn so that the corona wire 53 passes over both lines of apertures.

In order to create ions with an insulated wire, alternating current must be applied to the corona wire 53. This alternating current creates a pool of both negative and positive ions between the corona wire 53 and the ion deposition control device. The frequency of the alternating current must be sufficiently high to facilitate a rapid change in polarity in the corona wire 53; with insulated wires, after a certain period of time the insulation will cause a shutoff of further ion production. By changing the polarity with sufficient frequency, a substantially continuous production of ions of both polarities may be created; also the frequency should be high enough to avoid a strobing effect of bands of heavily and lightly charged areas on the moving charge receptor. Even though an alternating current corona wire 53 produces ions of both polarities, the "potential well" effect of the electrodes 106, 108, and 110 of the ion deposition control device will admit only one polarity type of ions to pass through the aperture 104. The insulated AC corona wire 53 can facilitate much higher currents than a DC wire, which in turn can charge desired areas on the charge receptor 27 very quickly. This relatively quick charging of the charge receptor 27 enables faster process speeds for the entire apparatus.

In general, whether an insulated AC wire or bare DC wire is preferable as an original ion source will depend on the design of the printing apparatus as a whole. In brief, an AC insulated wire has the advantage of simple and versatile physical configuration, but also the disadvantages of relative inefficiency (because at least half of the total ions created, those of the unnecessary polarity, are wasted) and the need to generate a sufficiently high frequency to avoid strobing. A DC wire has the advantage of high efficiency but the disadvantages of having to physically stretch the wire and the possibility of arcing.

When using an insulated corona wire 53, it is desirable to have a substantial air space between the corona wire 53 and the pinch electrode 106. Such a spacing allows an air flow between the ion source and the substrate 102. This air flow may be helpful in keeping dust from being attracted to the insulated corona wire 53. The presence of a substantial spacing between the insulated corona wire 53 and the pinch electrode 106 enables a more favorable angle for the pinch electrode 106 to funnel a large amount of ions into the aperture 104.

It will be apparent that the various aspects of the design improvements in the present specification, such as the diagonally-oriented displacing electrodes, the focus electrode, the reference electrode, and the AC insulated corona wire, can be variously combined for an optimal design of a particular apparatus.

While this invention has been described in conjunction with a specific apparatus, it is evident that many alternatives, modifications, and variations will be apparent to those skilled in the art. Accordingly, it is intended to embrace all such alternatives, modifications, and variations as fall within the spirit and broad scope of the appended claims.

We claim:

1. An ionographic image printing apparatus, comprising:

an ion source;

a charge receptor;

means for moving the charge receptor in a process direction at a predetermined velocity;

a substrate disposed between the ion source and the charge receptor defining an aperture for passage of ions therethrough;

a displacing electrode disposed on the substrate adjacent the aperture, to displace an ion stream passing through the aperture to a selectable extent along a displacement path in response to a variable bias placed thereon, the displacing electrode being positioned relative to the aperture with the displacement path oriented at a predetermined angle diagonal to the process direction; and means for regularly varying a bias on the displacing electrode at a predetermined rate as the charge receptor moves in the process direction, to position an ion stream along the displacement path;

the angle of the displacement path being selected to compensate for spot placement skew of discharged areas created by the ion stream on the charge receptor, with the charge receptor moving at the predetermined velocity and the bias varying at the predetermined rate.

2. The apparatus of claim 1, further comprising a pinch electrode including a conductive surface facing the ion source.

3. The apparatus of claim 1, the displacing electrode including a conductive surface facing the charge receptor.

4. An ionographic image printing apparatus, comprising:

an ion source;

a charge receptor;

means for moving the charge receptor in a process direction;

a substrate disposed between the ion source and the charge receptor defining two apertures for passage of ions therethrough;

a displacing electrode a disposed on the substrate adjacent the aperture, to displace an ion stream passing through the aperture to a selectable extent along a displacement path in response to a bias placed thereon, the displacing electrode being positioned relative to the aperture whereby the displacement path is diagonal to the process direction;

a pinch electrode disposed around each aperture, each pinch electrode including a conductive surface facing the ion source; and a reference electrode disposed on a surface of the substrate facing the ion source, between the apertures.

5. The apparatus of claim 4, wherein the substrate defines two parallel rows of apertures, and the reference electrode comprises a conductive member extending between the rows of apertures.

6. The apparatus of claim 1, wherein the ion source comprises a corona wire, and further comprising a reference electrode in the form of a conductive member disposed on the substrate, facing the corona wire and extending substantially parallel to the corona wire.

7. The apparatus of claim 1, wherein the ion source comprises an insulated corona wire.

8. The apparatus of claim 7, further comprising means for providing an AC bias to the insulated corona wire.

9. The apparatus of claim 8, the insulated corona wire and the substrate being spaced to form an air gap therebetween.

10. The apparatus of claim 1, the displacing electrode having an edge uniformly spaced not more than 3 mils from an edge of the aperture.

11. An ionographic image printing apparatus, comprising:

an ion source;

a charge receptor;

a substrate disposed between the ion source and the charge receptor defining an aperture for passage of ions therethrough;

a displacing electrode disposed on the substrate adjacent the aperture, to displace an ion stream passing through the aperture to a selectable extent along a displacement path in response to a variable bias placed thereon; and a focus electrode defining a second aperture, spaced from the displacing electrode and substantially aligned with the aperture, forming a concentrated electric field toward an aperture edge corresponding to a displacement path end, the second aperture including a border defining a space adjacent the aperture, the space defined by the border tapering to a point at the aperture edge corresponding to a displacement path end.

12. The apparatus of claim 11, wherein the focus electrode includes a conductive surface facing the charge receptor.

13. The apparatus of claim 11, wherein the second aperture is substantially diamond-shaped in cross section.

14. The apparatus of claim 11, further comprising a pinch electrode including a conductive surface facing the ion source.

15. An ionographic image printing apparatus, comprising:

an ion source;

a charge receptor;

a substrate disposed between the ion source and the charge receptor defining an aperture for passage of ions therethrough; and a displacing electrode disposed on the substrate adjacent the aperture, to displace an ion stream passing through the aperture to a selectable extent along a displacement path in response to a variable bias placed thereon, and forming a concentrated electric field toward an aperture edge corresponding to a displacement path end, the displacing electrode including a border defining a space adjacent the aperture, the space defined by the border tapering to a point at the aperture edge corresponding to a displacement path end.

16. The apparatus of claim 15, wherein the aperture is substantially diamond-shaped in cross section.

17. The apparatus of claim 15, further comprising a pinch electrode including a conductive surface facing the ion source.

* * * * *